No. 697,966. Patented Apr. 22, 1902.
A. BATH.
VEHICLE FRAME OR RUNNING GEAR.
(Application filed Apr. 6, 1901.)
(No Model.)
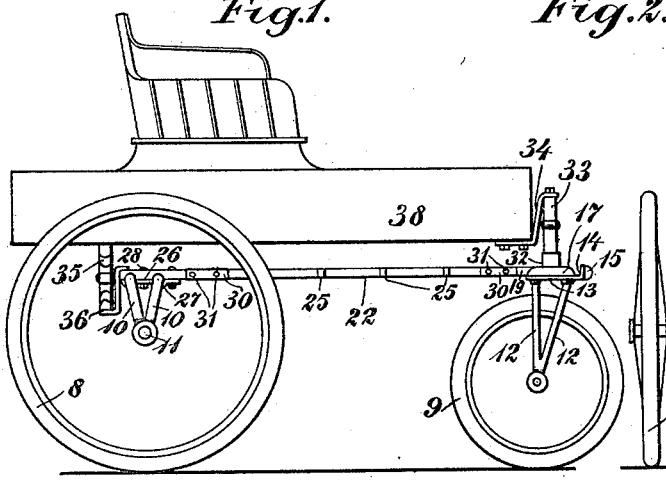
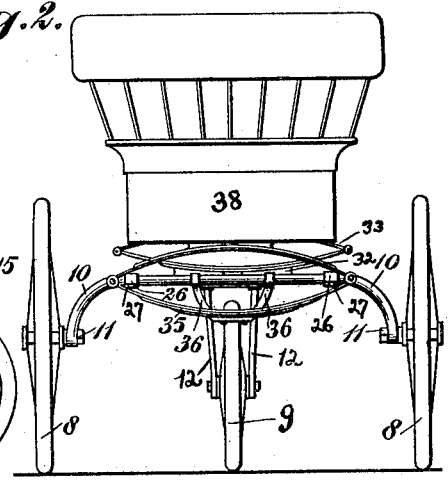
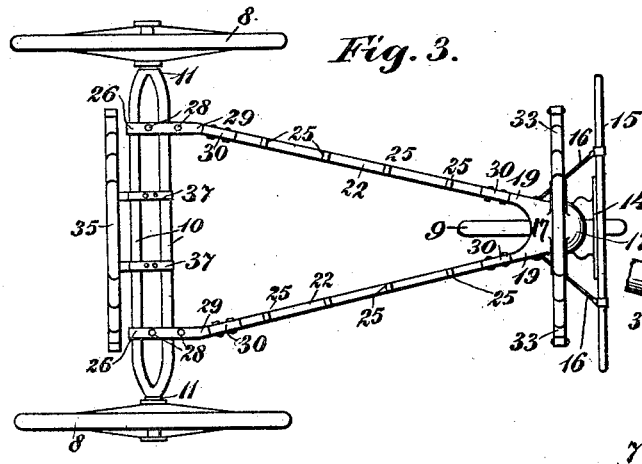
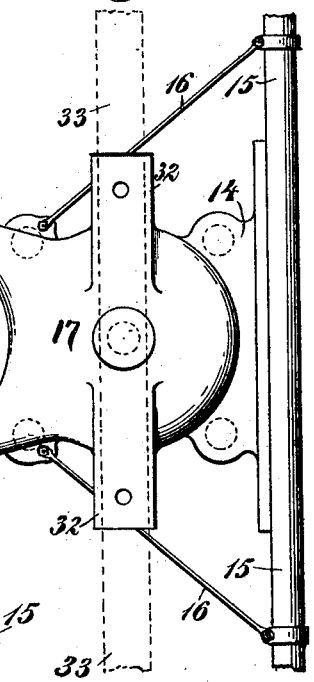
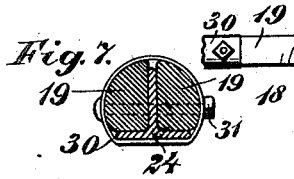
WITNESSES:
L. N. Legendre
Peter A. Ross
INVENTOR:
Abraham Bath
BY
Edmond Congar Brown,
ATTORNEY.
THE NORRIS PETERS CO., PHOTO-LITHO., WASHINGTON, D. C.

UNITED STATES PATENT OFFICE.

ABRAHAM BATH, OF NEW YORK, N. Y., ASSIGNOR, BY DIRECT AND MESNE ASSIGNMENTS, TO BLOOMER VEHICLE COMPANY.

VEHICLE FRAME OR RUNNING-GEAR.

SPECIFICATION forming part of Letters Patent No. 697,966, dated April 22, 1902.

Application filed April 6, 1901. Serial No. 54,569. (No model.)

*To all whom it may concern:*

Be it known that I, ABRAHAM BATH, a subject of the King of Great Britain and Ireland, and a resident of the borough of Manhattan, New York city, in the county of New York and State of New York, have invented certain new and useful Improvements in Vehicle Frames or Running-Gear, of which the following is a specification.

My invention relates to frames or running-gear for carriages or similar vehicles, more especially for vehicles having three wheels; and its object is to provide an improved form of an inexpensive, light, and graceful frame or running-gear which shall at the same time be easily assembled, durable, and capable of resisting all such strains as it may be subjected to.

The invention consists in the novel construction, combination, and arrangement of parts, as hereinafter more particularly described.

In the accompanying drawings, Figure 1 is a side view of a vehicle having a frame or running-gear constructed according to my invention. Fig. 2 is a rear view of the same; Fig. 3, a plan view; Fig. 4, a plan view, enlarged, of the front part of the running-gear; Fig. 5, a longitudinal vertical section showing the construction of the fifth-wheel; and Figs. 6 and 7, detail views hereinafter more particularly described.

In carrying my invention into effect I provide two rear wheels 8 8 and a preferably somewhat smaller front wheel 9. The axle for the rear wheels is duplex, being formed of two parts 10 10, having their middle portions separated by a short distance, but having their ends bent downward and toward each other and secured together and to castings 11 on each side of the vehicle. I prefer to construct the duplex axle of suitably-sized metal tubing and braze the ends together and onto nipples projecting from the castings 11; but it is obvious that the same may be constructed of any suitable material and form and may be secured together and to said castings in any suitable manner without departing from the spirit of my invention. Each of said castings 11 has a laterally-projecting portion constituting the axle-spindle, upon which the corresponding rear wheel is placed and secured in any suitable manner. The front wheel is mounted in a fork, each side of which is V-shaped, the upper ends of each member 12 of each V being secured to the plate 13, which forms the lower member of the fifth-wheel device. The plate 13 is centrally vertically perforated, the perforation being screw-threaded, and it is provided with an enlarged front portion 14, to which is bolted or otherwise secured a wooden bar 15, to which the shaft or pole of the vehicle may be secured. Strengthening-braces 16 extend from near the ends of the bar 15 to the rear portion of the plate 13. Over the plate 13 lies a casting 17, which forms the upper member of the fifth-wheel device and which is provided with a downwardly-projecting rim 18 and rearwardly-extending projections 19, (see Fig. 4,) the ends of which are vertically cleft, as shown in Fig. 7, which is a section taken on the line 7 7 of Fig. 4. The casting 17 is centrally perforated to correspond to the perforation in the plate 13, and a bolt 20 and nut 21 serve to pivotally secure the plate 13 and casting 17 together, forming the fifth-wheel.

The two reaches 22 22 connect the fifth-wheel to the rear axle. These reaches I prefer to form of wood, flat on the bottom and rounded on the upper surface, and provided with a vertical cleft extending upward nearly to the upper surface, forming a longitudinal channel or recess. Into the said cleft or channel I insert the stem of a T-iron, the arms of which lie against the flat lower surface of the wood and the whole being secured together at intervals by bands, as shown in Fig. 6, which is a vertical section of the reach at about the middle of its length and in which 23 represents the wooden portion, 24 the T-iron, and 25 one of the encircling bands. Instead of the said bands I may of course employ bolts passing through the wood and said T-iron or any other suitable securing means.

Near each end of the rear axle, just inside of the beginning of the downward curve thereof, are located two-part castings or clamping-pieces, composed of upper and lower members 26 and 27, respectively, connected by bolts 28. These clamping-pieces are transversely grooved to receive the duplex axle, and when placed one above and one below the same and bolted together are firmly attached thereto. The upper castings 26 are provided with forwardly-extending projections 29, approximately cylindrical and vertically cleft, analogous to the projections 19 of the casting 17.

The ends of each reach are secured as follows: The T-iron 24 extends a suitable distance beyond the wooden part at each end of the same, and the stem of these projecting ends of the T-iron is passed into the clefts in the projections 19 and 29, respectively, the arms of the T-iron lying against the lower part of the same. Around the said projections and also around the ends of the reach, the wooden part of which is at the ends shaped more nearly cylindrical, are placed sleeves 30, and bolts 31 are inserted, (see Fig. 4,) which hold all the parts firmly together. The manner of attachment is similar at each end of the reaches. It will be obvious that instead of reaches constructed as herein described ordinary tubings, the ends thereof being brazed to the projections 19 and 29, may be employed, or even ordinary wooden reaches bolted or otherwise suitably secured at their ends, without departing from the spirit of my invention.

The casting 17, constituting the upper member of the fifth-wheel, is provided with lateral projections 32 on each side of the head of the bolt 20, the space between same being wide enough to permit access to the bolt-head. These lateral projections serve as supports for the elliptic spring 33, which is secured thereto, and to the upper surface of which is secured the bracket 34, which supports the front end of the vehicle-body 38. The rear end of the vehicle-body is supported by an elliptic spring 30, the lower part of which is mounted upon a bracket 36, at the upper ends of which are forward projections 37, transversely grooved on their lower sides to receive the duplex axle and having bolted thereto corresponding lower pieces, (not appearing in the drawings,) the construction being analogous to the two-part clamp 26 27 heretofore described.

I prefer to use in connection with the other parts of my improved running-gear herein described wire-spoked wheels provided with pneumatic tires on account of their possessing a maximum of strength and resiliency, thus securing easy riding with a minimum of weight; but any suitable form of wheel may be employed, and I do not limit myself to the use of wheels of any kind whatever, it being obvious that to employ runners instead of wheels would be within the spirit of my invention. It will also be obvious that various other unimportant changes may be made and equivalents substituted for parts herein described without departing from the spirit of my invention.

Having thus described my invention, what I claim as new, and desire to secure by Letters Patent, is as follows:

1. In a vehicle frame or running-gear, the combination with a fifth-wheel comprising an upper and a lower member, the upper member having backwardly-extending bifurcated projections; and a rear axle and devices attached thereto having forwardly-extending bifurcated projections; of reaches, each comprising a T-iron and a rod or bar shorter than said T-iron and provided with a longitudinal channel or recess; the stem or leg of said T-iron at its ends being inserted between the bifurcated ends of the said projections respectively and between its ends being inserted in the channel or recess of the said rod or bar; and means for securing the ends of said reaches to said projections respectively.

2. In a vehicle frame or running-gear, the combination with a fifth-wheel comprising an upper and a lower member, the upper member having backwardly-extending bifurcated projections; and a rear axle and devices attached thereto having forwardly-extending bifurcated projections; of reaches, each comprising a T-iron and a rod or bar shorter than said T-iron and provided with a longitudinal channel or recess; the stem or leg of said T-iron at its ends being inserted between the bifurcated ends of the said projections respectively and between its ends being inserted in the channel or recess of the said rod or bar; and bolts passing through said bifurcated ends of said projections and through the ends of said T-irons inserted between the same.

3. In a vehicle frame or running-gear, the combination with a fifth-wheel comprising an upper and a lower member, the upper member having backwardly-extending bifurcated projections; and a rear axle and devices attached thereto having forwardly-extending bifurcated projections; of reaches, each comprising a T-iron and a rod or bar shorter than said T-iron and provided with a longitudinal channel or recess; the stem or leg of said T-iron at its ends being inserted between the bifurcated ends of the said projections respectively and between its ends being inserted in the channel or recess of the said rod or bar; and means for securing the ends of said reaches to said projections respectively, comprising sleeves or bands embracing the contiguous ends of said projections and reaches and bolts passing through said sleeves, bifurcated projections, and ends of the T-iron inserted therein, and bolts passing through said sleeves and the ends of the reaches inserted therein.

4. In a vehicle frame or running-gear, the combination with a fifth-wheel comprising an upper and a lower member, the upper member having backwardly-extending bifurcated projections; a duplex rear axle, comprising two middle portions approximately parallel and horizontal for part of their length but bent downward and toward each other at their ends, and end pieces or castings having laterally-projecting axle-spindles adapted to receive wheels; and two-part castings or clamps transversely grooved to receive said duplex axle between them and bolted thereto and provided with forwardly-extending bifurcated projections; of reaches, each comprising a T-iron and a rod or bar shorter than said T-iron and provided with a longitudinal channel or recess; the stem or leg of said T-iron at its ends being inserted between the bifurcated ends of the said projections respectively and between its ends being inserted in the channel or recess of the said rod or bar; and means for securing the ends of said reaches to said projections respectively.

5. In a vehicle frame or running-gear, the combination with a fifth-wheel comprising an upper and a lower member, the upper member having backwardly-extending bifurcated projections; a duplex rear axle, comprising two middle portions approximately parallel and horizontal for part of their length but bent downward and toward each other at their ends, and end pieces or castings having laterally-projecting axle-spindles adapted to receive wheels; and two-part castings or clamps transversely grooved to receive said duplex axle between them and bolted thereto and provided with forwardly-extending bifurcated projections; of reaches, each comprising a T-iron and a rod or bar shorter than said T-iron and provided with a longitudinal channel or recess; the stem or leg of said T-iron at its ends being inserted between the bifurcated ends of the said projections respectively and between its ends being inserted in the channel or recess of the said rod or bar; and bolts passing through said bifurcated ends of said projections and through the ends of the said T-irons inserted between the same.

6. In a vehicle frame or running-gear, the combination with a fifth-wheel comprising an upper and a lower member, the upper member having backwardly-extending bifurcated projections; a duplex rear axle, comprising two middle portions approximately parallel and horizontal for part of their length but bent downward and toward each other at their ends, and end pieces or castings having laterally-projecting axle-spindles adapted to receive wheels; and two-part castings or clamps transversely grooved to receive said duplex axle between them and bolted thereto and provided with forwardly-extending bifurcated projections; of reaches, each comprising a T-iron and a rod or bar shorter than said T-iron and provided with a longitudinal channel or recess; the stem or leg of said T-iron at its ends being inserted between the bifurcated ends of the said projections respectively and between its ends being inserted in the channel or recess of the said rod or bar; and means for securing the ends of said reaches to said projections respectively, comprising sleeves or bands embracing the contiguous ends of said projections and reaches and bolts passing through said sleeves, bifurcated projections, and ends of T-irons inserted therein, and bolts passing through said sleeves and the ends of the reaches inserted therein.

7. In a vehicle frame or running-gear, the combination with a duplex rear axle provided with axle-spindles; two-part castings or clamps transversely grooved to receive said duplex axle between them and secured thereto; and a fifth-wheel comprising an upper and a lower member pivotally secured together; of reaches secured to said casting or clamp and to the upper member of said fifth-wheel.

8. In a vehicle frame or running-gear, the combination with a duplex rear axle provided with axle-spindles; two-part castings or clamps transversely grooved to receive said duplex axle between them and secured thereto and a fifth-wheel comprising an upper and a lower member pivotally secured together said lower member provided with a wheel-fork; of reaches secured to said casting or clamp and to the upper member of said fifth-wheel.

9. In a vehicle frame or running-gear, the combination with a duplex rear axle provided with axle-spindles; a fifth-wheel comprising an upper and a lower member pivotally secured together, the upper member being provided with elevated lateral projections adapted to support a spring secured thereto; and a fork secured to the lower member of said fifth-wheel; of reaches secured to said duplex axle and to the upper member of said fifth-wheel.

10. In a vehicle frame or running-gear the combination with a duplex rear axle provided with axle-spindles; a fifth-wheel comprising an upper and a lower member pivotally secured together, the upper member being provided with elevated lateral projections adapted to support a spring secured thereto; and a fork secured to the lower member of said fifth-wheel; of reaches secured to said duplex axle and to the upper member of said fifth-wheel, comprising a T-iron and a rod or bar having a longitudinal channel or recess.

11. In a vehicle frame or running-gear the combination with a duplex rear axle provided with axle-spindles, said axle having secured thereto two-part castings or clamps having forwardly-extending bifurcated projections; a fifth-wheel comprising an upper and lower member pivotally secured together, the upper member being provided with rearwardly-extending bifurcated projections, and elevated lateral projections adapted to support a spring secured thereto; and a fork secured to the lower member of said fifth-wheel; of reaches comprising a T-iron and a rod or bar having a longitudinal channel or recess, the said T-iron being inserted in said channel or recess and projecting ends of the same being inserted in the said bifurcations and there secured.

Signed at New York city, in the county of New York and State of New York, this 4th day of April, A. D. 1901.

ABRAHAM BATH.

Witnesses:
H. SCHANZLIN,
PETER A. ROSS.